March 28, 1950     B. G. ALDRIDGE     2,501,751
PULSATION AND FLOW CONTROL SYSTEM FOR GAS LINES
Filed March 15, 1946
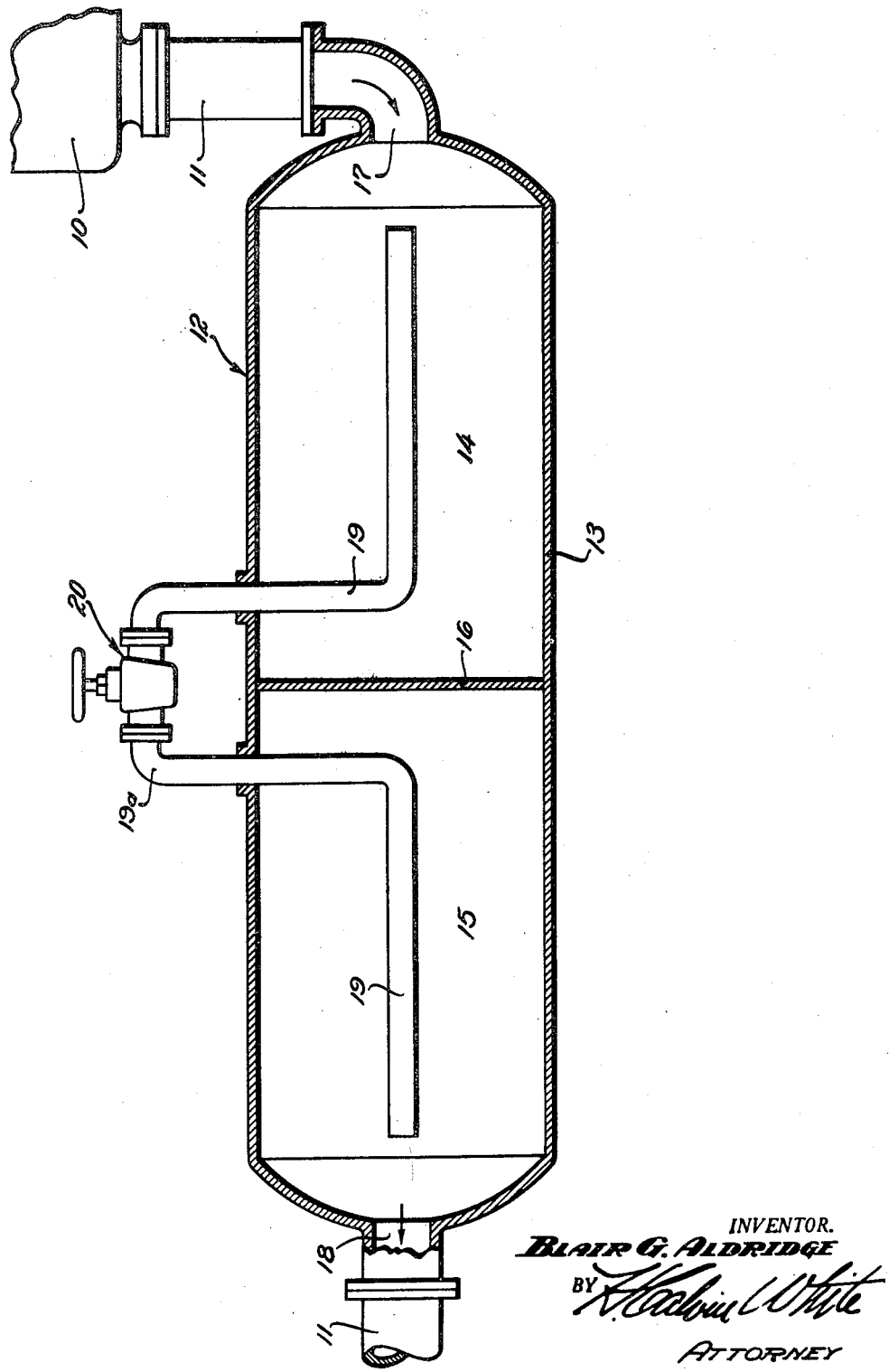
INVENTOR.
BLAIR G. ALDRIDGE
BY
ATTORNEY Patented Mar. 28, 1950

2,501,751

UNITED STATES PATENT OFFICE 2,501,751

PULSATION AND FLOW CONTROL SYSTEM FOR GAS LINES

Blair G. Aldridge, Los Angeles, Calif., assignor to The Fluor Corporation, Ltd., Los Angeles, Calif., a corporation of California Application March 15, 1946, Serial No. 654,701

7 Claims. (Cl. 138—26)

This invention has to do generally with apparatus for the dampening or elimination of pulsations created in a gas line by a compressor or the like, and particularly with installations involving the use of pulsation dampening equipment of the type and character disclosed in Stephens application Ser. No. 517,857 on Pulsation elimination in gas lines, now Patent No. 2,405,100, issued July 30, 1946, and in application Ser. No. 546,657 on Gas pulsation dampening apparatus, now Patent No. 2,437,446, issued March 9, 1948.

Generally speaking, the pulsation dampening equipment of the form with which the invention is concerned, comprises a pair of relatively large chambers or capacitances connected in the gas line, as at the discharge side of a compressor in a natural gas compressor plant, for series flow of the gas through the chambers. The chamber combination may be rendered effective for the virtual elimination of substantial pulsations from the gas stream, by interconnecting the chambers with a relatively restricted passage, in the nature of an acoustical resistance or induction, formed for example by an extended pipe, the dimensions of which are selected to give the passage the desired acoustical properties and relation to the chambers.

Now the main gas line, say beyond or at the discharge side of the pulsation eliminating equipment, is sized to pass the maximum expected gas flow without serious pressure drop, and consequently the line size (pipe diameter) is usually large, e. g. in the order of ten inches, and above. It is customary and ordinarily necessary to include in the line a shut-off valve, either manually or motor operated, for closing the line, or a branch, against gas flow. Due to the large pipe size, such valves are correspondingly large and very expensive.

My major object is to effect a considerable reduction in the size and cost in a shut-off valve capable of serving the purposes of the usual valves, by taking advantage of a favorable relation that may be made to exist between the sizes of the line pipe and the aforementioned pipe connection between the pulsation dampener chambers. It is found that to serve the acoustical purposes of the system, this pipe connection may be made using pipe of greatly reduced diameter as compared with the line pipe. For example, where the line pipe may be ten inches or larger in diameter, the chamber interconnection may satisfactorily be no larger than a four inch diameter pipe. Thus, in accordance with the invention, I place in the chamber interconnecting pipe a manually or motor operated valve capable of entirely closing off gas flow between the chambers and to or from the main larger size line, and of such small size compared with a valve sized to the main line, as to permit possible savings of several hundred dollars in the valve cost.

The invention further contemplates a novel unitized chamber, interconnection and valve assembly in which the chambers are contained in a single shell and interconnected by a pipe preferably carrying the valve at a location outside the shell.

The various objects and features of the invention as well as the details of an illustrative embodiment, will be further explained in the following description by reference to the accompanying drawing.

Referring to the drawing, numeral 10 indicates conventionally a gas compressor operating, for example, in a natural gas compressor plant to compress and discharge the gas through the usual relatively large size (e. g. 10 inch diameter or larger) line 11 for field distribution or other disposal. As previously indicated, it has been necessary in virtually all such installations to provide a shut-off valve or cock in the line 11, the valve or cock being of corresponding size and consequently very expensive. In accordance with the invention, it is made possible to obviate the necessity for using such large valve sizes by the permissible incorporation or a shut-off valve in a pulsation dampener assembly installed in the line 11 and as generally indicated at 12.

The pulsation dampener 12 is shown to comprise, in its preferred form, an elongated shell 13 containing a pair of chambers 14 and 15 separated by a transverse partition 16. The chambers are interconnected for series flow of the gas therethrough from the inlet 17 to the outlet 18, by a restricted passage, the requirements of which are such that it may be contained in a pipe of considerably smaller diameter than the main gas line 11. Thus the restricted interconnection between the chambers is shown to be formed by an elongated, relatively small diameter (e. g. 4 inch) pipe 19 extending substantial distances within both the chambers 14 and 15, and through and at the outside of the shell 13 as at 19a. The accessible portion 19a of the pipe may contain the shut-off valve 20 of suitable type, either manually or motor operated, which normally remains open but may be closed to completely cut-off communication between the chambers 14 and 15 and all gas flow through the line 11. Thus the shut-off function is served by a relatively small and inexpensive valve 20, as compared with the usual large valves sized to correspond with the line 11. The valve 20 also may serve as a variable resistance to the entire gas flow passing from chamber 14 into chamber 15.

Reference may be had to the co-pending applications referred to above, for more particularities concerning the dimensional and other characteristics of the dampener 12 as required for the removal of pulsations from a gas stream having determinable flow characteristics and other properties. Present purposes will be served by brief reference to the considerations taken into account in the design and construction of the pulsation dampener.

The volumes of the chambers 14 and 15, and the dimensions of the interconnecting passage in pipe 19, may be evalued or predetermined with relation to the particular conditions for which the installation is to be made. The basis for these determinations is the following equation:

$$\frac{L}{R^2} \times V = \frac{C^2}{78.674 F^2}$$

wherein

L = the length in inches of the passage in pipe 19.
R = radius in inches of that passage.
V = the volume in cubic inches of one of the equal volume chambers 14 or 15.
C = net velocity, as defined below, in feet per minute of sound in the gas and of the gas stream in pipe 19.
F = fundamental frequency per second of pulsations created in the gas line 11 by the compressor and at the compressor outlet.

With the apparatus installed at the discharge side of the compressor, the value of C is the velocity of the gas in line 19 plus the velocity of sound in the gas (as may be determined from tabulated data in the literature). Inasmuch as the velocity of the gas is very low as compared with the velocity of sound in the gas, the former ordinarily may be disregarded without serious consequences.

When a reciprocating compressor is the source of the pulsations, it is possible to determine the fundamental frequency F of the pulsations in accordance with the R. P. M. of the compressor, as will be understood by those familiar with gas compressor operation. Generally speaking, the value for F may be taken within the range of about 85% to 100% of the compressor fundamental frequency. Where the compressor is operable at variable frequencies, or speeds, the value for F preferably is selected to be just less than the lowest frequency.

The left-hand side of the equation, i. e.

$$\frac{L}{R^2} \times V$$

defines the volume of each chamber, and the length and inside radius of the connecting pipe 19. The value of V is to be interpreted as a minimum value, i. e. the minimum corresponding volume of the chambers. In other words, the actual chamber volumes individually may be greater, and they may be equal or unequal, so long as they have at least a minimum volume corresponding to V as it be determined by the equation.

A value for $$\frac{L}{R^2}$$

may arbitrarily be taken to be as large as can be tolerated with regard to the pressure drop to be taken by the gas in flowing through line 19. In other words, knowing the gas pressure at the chamber 14 and the rate of gas flow to occur through the line 19, the latter may be given length and radial dimensions, arbitrarily or mathematically determined, permitting gas flow through the pipe 19 within a permissible range of pressure drop.

In all installations it is possible to use a pipe 19 of such greatly reduced diameter as compared with the size of line 11, as to enable the valve 20 to be considerably smaller than the shut-off valves ordinarily required.

I claim:

1. In combination with a relatively large diameter pipe receiving gas from a compressor, apparatus for dampening pulsations created in the gas stream by the compressor, comprising a single shell containing first and second separate chambers normally in pressure transmitting communication at spaced locations with the gas stream flowing from the compressor continuously and at a substantially constant rate, means connecting said second chamber with said large diameter pipe, a relatively small diameter pipe forming a restricted gas passage interconnecting said chambers between said locations, and a valve in and corresponding in size to said small diameter pipe operable to completely close off gas flow between the chambers.

2. In combination with a relatively large diameter pipe receiving gas from a compressor, apparatus for dampening pulsations created in the gas stream by the compressor, comprising a single shell containing first and second separate chambers normally receiving gas in series flow from the compressor continuously and at a substantially constant rate, means connecting said second chamber with said large diameter pipe, an extended relatively small diameter pipe forming an elongated restricted acoustical inductance gas passage interconnecting said chambers, and a valve in and corresponding in size to said small diameter pipe operable to completely close off gas flow between the chambers.

3. In combination with a relatively large diameter pipe receiving gas from a compressor, apparatus for dampening pulsations created in the gas stream by the compressor, comprising a single shell containing first and second separate chambers normally receiving gas in series flow from the compressor continuously and at a substantially constant rate, means connecting said second chamber with said large diameter pipe, a relatively small diameter pipe forming a restricted gas passage interconnecting said chambers, and means associated with said small diameter pipe for varying the rate of gas flow therethrough.

4. In combination with a relatively large diameter pipe receiving gas from a compressor, apparatus for dampening pulsations created in the gas stream by the compressor, comprising a single shell containing separate first and second chambers normally in pressure transmitting communication at spaced locations with the gas stream flowing from the compressor continuously and at a substantially constant rate, means connecting said shell and second chamber with said large diameter pipe, a relatively small diameter pipe interconnecting said chambers and extending outside said shell to form a restricted passage through which gas flows from said first chamber to the second chamber between said locations, and means in said small diameter pipe operable to completely close off gas flow between the chambers.

5. Apparatus for dampening pulsations created in a gas stream by a compressor, comprising a single shell containing separate chambers in pressure transmitting communication at spaced locations with the gas stream flowing through the shell, said chambers respectively having relatively large diameter inlet and outlet openings, a relatively small diameter pipe forming a restricted gas passage interconnecting said chambers, and a valve in said pipe and corresponding in size to the pipe size.

6. Apparatus for dampening pulsations created in a gas stream by a compressor, comprising a single shell containing separate chambers to receive gas in series flow therethrough, said chambers respectively having relatively large diameter inlet and outlet openings, a relatively small diameter pipe forming a relatively restricted gas passage interconnecting said chambers and through which all the gas flows in passing from one to the other of said chambers, said pipe being longer than the shell length, and a valve in said pipe and corresponding in size to the pipe size.

7. Apparatus for dampening pulsations created in a gas stream by a compressor, comprising a single shell containing separate chambers to receive gas in series flow therethrough, said chambers respectively having relatively large diameter inlet and outlet openings, a relatively small diameter pipe forming a relatively restricted gas passage interconnecting said chambers and extending within and outside the shell, and a valve in the pipe at a location outside the shell and corresponding in size to the pipe size.

BLAIR G. ALDRIDGE.

REFERENCES CITED

The following references are of record in the file of this patent:

UNITED STATES PATENTS

| Number | Name | Date |
|---|---|---|
| 1,021,254 | Larkins | Mar. 26, 1912 |
| 1,459,797 | Parolini et al. | June 26, 1923 |
| 1,739,039 | Powell | Dec. 10, 1929 |
| 1,860,569 | Bourne | May 31, 1932 |
| 2,404,589 | Monaghan | July 23, 1946 |
| 2,405,100 | Stephens | July 30, 1946 |

Certificate of Correction

Patent No. 2,501,751

March 28, 1950

BLAIR G. ALDRIDGE

It is hereby certified that error appears in the printed specification of the above numbered patent requiring correction as follows:

Column 5, line 20, after the syllable "bers" and before the comma insert the words *between said locations*; and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*